Patented Feb. 15, 1944

2,341,567

UNITED STATES PATENT OFFICE 2,341,567

PROCESS FOR REMOVING FLUORINE FROM HYDROCARBON DISTILLATES

Francis C. Moriarty, Chicago, Ill., assignor to Universal Oil Products Company, Chicago, Ill., a corporation of Delaware No Drawing. Application January 25, 1943, Serial No. 473,524

10 Claims. (Cl. 196—41)

This invention relates to a process for treating hydrocarbon mixtures to remove fluorine therefrom. More specifically, it relates to the treatment of synthetic hydrocarbons produced in the presence of active fluoride catalysts to remove small amounts of organically combined fluorine. The invention is particularly adapted to the treatment of hydrocarbons produced by the alkylation of isoparaffinic hydrocarbons with olefinic hydrocarbons using active fluoride catalysts.

The alkylation of branched chain paraffinic hydrocarbons, such as isobutane, isopentane, etc., with olefinic hydrocarbons, such as propylene, butylene, etc., to produce saturated liquid hydrocarbons utilizable as motor fuels has assumed commercial importance. By this means relatively low boiling isoparaffinic hydrocarbons may be alkylated with low boiling olefins, thereby converting materials which have relatively low commercial value into hydrocarbons which have high antiknock properties and which are particularly useful as components in aviation gasoline.

Active fluoride catalysts, including hydrogen fluoride or hydrofluoric acid and mixtures comprising hydrogen fluoride and boron tri-fluoride are used in the alkylation of isoparaffins by olefins, but it has been found that the resultant alkylation product frequently contains minor quantities of fluorine in combination with the hydrocarbons, possibly due to the interaction of hydrogen fluoride with the olefin constituents of the reaction mixture under the influence of the catalyst.

Although the fluorine content of the hydrocarbon product of gasoline boiling range is rarely very high, its presence is undesirable, both from the standpoint that the combustion products of such a fuel may be extremely corrosive, as well as the fact that the octane number of the hydrocarbon distillate, with or without added antidetonating agents, is considerably reduced. Thus, it may be shown that motor fuels containing as much as 0.1% by weight of fluorine have inferior antiknock properties, particularly as concerns their response to tetraethyl lead, as compared with the same material which contains substantially no fluorine compounds. The present invention offers a method for reducing the fluorine content of the hydrocarbons to a point where this adverse effect is no longer substantial.

In one specific embodiment the present invention relates to a process for treating a hydrocarbon distillate produced by the catalytic alkylation of an isoparaffin with an olefin in the presence of an active fluoride catalyst, which comprises treating said hydrocarbon distillate with calcium carbonate, and particularly limestone, and recovering the treated hydrocarbon product.

According to the present invention the liquid hydrocarbon product containing organic fluoride compounds obtained from alkylation in the presence of a catalyst-containing hydrogen fluoride, is contacted with calcium carbonate and particularly limestone. Limestone is preferred because of its cheapness and ready availability, although other calcium carbonate composites, either naturally occurring or synthetically prepared and either substantially pure or contaminated with varying amounts of other materials, may be used providing they are sufficiently porous and will form calcium fluoride compounds under conditions of operation. Thus, chalk, marl, egg shells, sea shells and particularly oyster shells, etc., may be employed but not necessarily with equivalent results.

When desired, the calcium carbonate material may be dried and calcined at a temperature in excess of the treating temperature but below that at which the treating effectiveness is injured. The catalyst may be used in the form in which it is recovered or it may be crushed to a powder or formed into granules or particles of definite size and shape by mechanical means.

The process may be conducted by disposing the contact agent in one or a plurality of towers and passing the hydrocarbon distillate in contact therewith under suitable temperature and pressure conditions. Usually at least two of such towers are employed so that the process may be continuous. Thus, when the contact agent in one of the treating towers becomes spent, it may be removed from the system for revivification or withdrawal and replacement of the spent contact agent, while the other tower is in operation.

The process of the present invention is conducted at a temperature which generally is above 100° F. and below that at which substantial decomposition of the hydrocarbon alkylation product occurs due to cracking or other unsatisfactory reactions, and thus will usually be below about 600° F. The liquid space velocity usually employed is between about 1 and about 5, usually employing higher space velocities at the higher temperatures. The term "space velocity" as used herein refers to the volume of liquid hydrocarbon charge per volume of contact agent per hour. The pressure employed may be either subatmospheric, atmospheric or superatmospheric up to 1000 pounds or more.

The invention also includes the use of mixtures of calcium carbonate and alumina-containing materials such as bauxite, aluminum silicates such as clays, fuller's earth, synthetic composites of alumina and silica, etc. The preferred composite comprises limestone and bauxite. The operating conditions will be within the broad range heretofore described. The mixed reagents may comprise separate layers, alternate layers, or a mixture of these reagents in powdered or granular form. Usually the quantity of these reagents will be substantially equal but it is within the scope of invention to utilize these materials in ratios of 10% of one to 90% of the other.

The following examples are given for the purpose of further illustrating the invention but not with the intention of unduly limiting the same.

Example I

An alkylate produced by the alkylation of isobutane with butylene in the presence of hydrogen fluoride catalyst and containing 0.0125% by weight of fluorine was treated with limestone at 275° F., atmospheric pressure, and liquid space velocity of 1 to yield a final product entirely free of fluorine.

Example II

Another alkylate containing 0.032% by weight of fluorine was treated under substantially the same conditions as indicated in Example I with limestone and the product was re-run to 300° F. end point to yield a final product containing 0.0018% fluorine by weight.

Example III

The alkylate utilized in Example II was distilled to produce a product having an end point of 330° F. and this product was then treated with limestone under substantially the same conditions as indicated in Example I to produce a final product having a fluorine content having 0.0011% by weight.

Example IV

The same alkylate was utilized as Examples II and III was treated with oyster shells under substantially the same conditions as in the preceding examples to yield a final product having a fluorine content of 0.0042%.

Example V

Isobutane is alkylated with a mixture of propylene and butylene in the presence of a hydrogen fluoride catalyst and at a temperature of about 100° F. while using an isobutane to olefin ratio on a molal basis of about 7 to 1. The alkylate contains about 0.01% by weight of fluorine and is then subjected to treatment with a mixture of bauxite and limestone in equal proportions at a temperature of 240° F. under a pressure of 300 pounds per square inch. The fluorine content of the hydrocarbon distillate will thus be reduced from the original 0.01% by weight to about 0.001% by weight.

I claim as my invention:

1. A process for treating a fluorine containing hydrocarbon fraction to remove the fluorine therefrom which comprises contacting said fraction with calcium carbonate.

2. A process such as defined in claim 1 wherein said calcium carbonate comprises limestone.

3. A process such as defined in claim 1 wherein said calcium carbonate comprises sea shells.

4. A process such as defined in claim 1 wherein said calcium carbonate comprises oyster shells.

5. A process such as defined in claim 1 wherein said calcium carbonate comprises egg shells.

6. A process for treating a hydrocarbon distillate produced by the alkylation of an isoparaffin with an olefin in the presence of an active fluoride catalyst to remove fluorine from said distillate which comprises subjecting it to treatment with limestone.

7. A process for removing fluorine from a hydrocarbon distillate produced by the alkylation of an isoparaffin with an olefin in the presence of a hydrogen fluoride catalyst which comprises subjecting said hydrocarbon distillate to treatment with limestone at a temperature of from about 150° to about 600° F. and under a pressure of from about atmospheric to about 1000 pounds per square inch.

8. A process for treating a hydrocarbon fraction containing fluorine to remove the fluorine therefrom which comprises contacting said fraction with a mixture of calcium carbonate and an alumina-containing compound.

9. A process such as defined in claim 8 wherein said calcium carbonate comprises limestone and wherein said alumina-containing compound comprises bauxite.

10. A process for removing fluorine from a hydrocarbon distillate produced by the alkylation of an isoparaffin with an olefin in the presence of an active fluoride catalyst which comprises subjecting said hydrocarbon distillate to treatment with a mixture of limestone and bauxite.

FRANCIS C. MORIARTY.